United States Patent [19]

Steenblik

[11] Patent Number: 4,717,239

[45] Date of Patent: Jan. 5, 1988

[54] STEREOSCOPIC PROCESS AND APPARATUS USING DIFFRACTIVE OPTICAL ELEMENTS

[75] Inventor: Richard A. Steenblik, Stone Mountain, Ga.

[73] Assignee: Georgia Tech Research Corporation, Atlanta, Ga.

[21] Appl. No.: 835,948

[22] Filed: Mar. 4, 1986

Related U.S. Application Data

[62] Division of Ser. No. 568,419, Jan. 5, 1984, Pat. No. 4,597,634.

[51] Int. Cl.⁴ .................. G02B 27/22; G02B 27/42
[52] U.S. Cl. ........................... 350/144; 350/130; 350/145; 350/320
[58] Field of Search ............. 350/144, 130-132, 350/3.7, 162.17, 162.18, 168, 286, 287, 145, 320

[56] References Cited

PUBLICATIONS

Ivo Kohler, "Experiments with Goggles", *Scientific American*, vol. 206, No. 5, May 1962, pp. 62–72.
T. Sincerbox, "Formation of Optical Elements by Holography", vol. 10, No. 3, Aug. 1967, p. 2.

*Primary Examiner*—Jon W. Henry
*Attorney, Agent, or Firm*—Newton, Hopkins & Ormsby

[57] ABSTRACT

A method and apparatus for producing and viewing stereoscopic images through the use of a color coded image whereby the desired depth or distance is based upon the color of the portion of the image being viewed. Therefore the parts of the image which are to appear distant are colored red whereas the parts of the image to appear in the foreground are colored blue with the middle ground or intermediate distances being colored green or yellow. The color coded image is viewed through a prism glass constructed so that blue light which passes through the prism is bent toward a sharper angle than red light. Because the apex of the prism before each eye points toward the nose or center of the glasses the eyes must then turn more inward to see a blue object than to see a red object even though they are in actuality in the same plane on the display. This leads to brain to interpret, by means of parallax, that the blue image is closer and the red image is more distant unless the parallax is greatly contradicted by other depth clues such as relative size, position and perspective. In a preferred form, a double prism is used for each eye in order to eliminate single prism problems such as visual disorientation and eye strain.

31 Claims, 29 Drawing Figures

UNCORRECTED PRISM

NEGATIVE DIOPTER CORRECTED PRISM
(CURVATURES EXAGGERATED)

STEREOSCOPIC PROCESS AND APPARATUS USING DIFFRACTIVE OPTICAL ELEMENTS

This is a divisional of co-pending application Ser. No. 568,419 filed on Jan. 5, 1984 now U.S. Pat. No. 4,597,634.

BACKGROUND OF THE INVENTION

1. Field of the Invention

This invention relates to a process and an apparatus whereby color images, particularly computer generated images for such items as air traffic control displays, binocular microscopy, and viewing of printed pictures, may be generated, viewed and perceived as having depth.

2. Description of the Prior Art

Previous processes for viewing stereoscopically formed images require the generation of at least two images of the same scene. This usually took the form of a right side view and a left side view and required to use of a separate system to separate the images by feeding one of the images to each eye. Thus there were formed two laterally displaced essentially simultaneously exposed negatives or impressions in order to form two images of the scene. The lateral displacement between the two images was usually such that it was equivalent to the distance between the viewer's eyes. The results were viewed through a stereo opticon which allowed each eye to see only one of the images portrayed by the negative or the impression. The difference between the two images seen by the viewer was translated by the brain into a sense of depth to give the impression of a three-dimensional scene. This technique was mainly applicable to black and white images.

For purposes of colored images the separation required was usually effected by producing a first image along one line of sight of the scene which was limted in color content by a filter to one half of the visible line spectrum and producing a second image along another line of sight of the scene which was limited in color content by a filter to the remaining half of the visible color spectrum. The two images were then combined and projected onto a common screen for a movie or printed upon a medium. The result was viewed by placing a different color filter in front of each eye with each filter being essentially exclusive in order to permit each eye to see only one of the color limited scenes. The discrepancy existing in the scenes which were perceived between the viewer's eyes was translated by the brain to provide a sense of depth and hence a three-dimensional effect.

Recent variations including that disclosed in U.S. Pat. No. 4,281,341 provide for a stereoscopic television system which uses a switchable optical polarizer to alternately form images which correspond to the left and right eyes on the television camera tube. A corresponding switchable polarizer was used in combination with the television monitor to produce images which are alternately vertically and horizontally polarized.

One of the primary disadvantages with regard to the prior art methods is the necessity of generating at least two images which represent different perspectives of each scene to be viewed. Full color images were only possible by using polarizing filters over the eyes which required a spinner polarizer to be placed in front of the video display, scanned in synchronization with alternating scenes. Another method was a complicated shutter arrangement whereby the image to each eye is alternately cut off and passed according to which image is on the screen. Each of these systems are both complicated and difficult to synchronize.

SUMMARY OF THE INVENTION

Accordingly, it is an object of the present invention to provide a novel process and apparatus which overcomes the prior art problems with regard to producing and viewing a stereoscopic image so that color images for such items as air traffic control display, binocular microscopy and viewing of printed pictures, and particularly computer generated color images, may be viewed and perceived as having depth.

It is also an object of the present invention to provide a stereoscopic process which does not require modification of existing hardware and which only requires a minor alteration of existing software in order to be implemented with computer generated images.

It is further an object of Applicant's invention to provide a process which does not require the generation of more than one view of each scene and whereby the viewing apparatus can be easily fabricated from plastic, glass, optical liquids, or combinations of these materials, having no moving parts and requiring no batteries nor other power supply.

The stereoscopic process according to Applicant's invention may be applied to any type of color image, including color video images generated by a computer, such as, video games and computer aided design images. The stereoscopic function realized from Applicant's invention may be used for entertainment by adding further realism to a video game or it may be used to give greater realism to computer control training aids as for example the use of teaching air or space flight. This invention may also be used to make air traffic control displays more easily interpreted by showing the altitude of the aircraft as a separation of depth from aircraft at other altitudes. It can also be used to add depth and realism to "Heads-up" aircraft cockpit displays, rendering them more useful by providing an additional dimension for the presentation of information. Yet another application is to the field of binocular microscopy, in which this invention can be used to make stained specimen appear in three dimension. Additionally, the process and apparatus according to Applicant's invention can be used to aid the perception of a computer aided design image by separating levels of printed circuit construction, for example, or by "three-dimensionalizing" a perspective drawing.

These and other objects of the present invention are accomplished by Applicant's process whereby the image to be viewed as color coded according to distance of depth desired and the images viewed through prism goggles or glasses. The color coding of the image is accomplished by coloring portions of the image which are to appear distant as red and the portions of the image which are to appear in the middle ground as either green or yellow with the portions of the image to be in the foreground being colored blue. The remaining intermediate positions can be colored accordingly using only pure colors.

The opposite coloring arrangement can also be used by reversing the optics so that, for example, distant objects are colored blue, with objects in the middle ground being colored yellow or green, while objects in the foreground are colored red.

One embodiment of the viewing prism glasses of Applicant's invention are constructed so that the apex of the prism before each eye points towards the nose or center of the glasses with the edges defined by the apexes of the prism being parallel and vertical. This applies equally to single prisms, tuneable depth holographic optics, etc. When the scene is viewed through the glasses, blue objects will appear near, green objects intermediate and red objects distant or the opposite color-distance relationship if the optics are reversed.

It is another object of the invention to provide a double prism arrangement for each eye in order to alleviate problems with regard to visual disorientation and eye strain sometimes caused by single prism arrangements. These double prism arrangements also provide for flexability in providing for arrangements which allow for adjustment of degrees of depth perception.

BRIEF DESCRIPTION OF THE DRAWINGS

A more complete appreciation of the invention and many of the attendant advantages thereof will be readily obtained as the same becomes better understood by reference to the following detailed description when considered with the accompanying drawings wherein:

FIG. 3b is an alternative arrangement of the double prism of FIG. 3a;

FIG. 3c is a modification of the double prism arrangement of FIG. 3a;

FIG. 5 illustrates multiple prism arrangements equivalent to the double prism of FIG. 3a; and FIG. 6 shows the use of a diffraction grating element as an alternative to the double prism of FIG. 3a;

DESCRIPTION OF THE PREFERRED EMBODIMENTS

Figure 1:
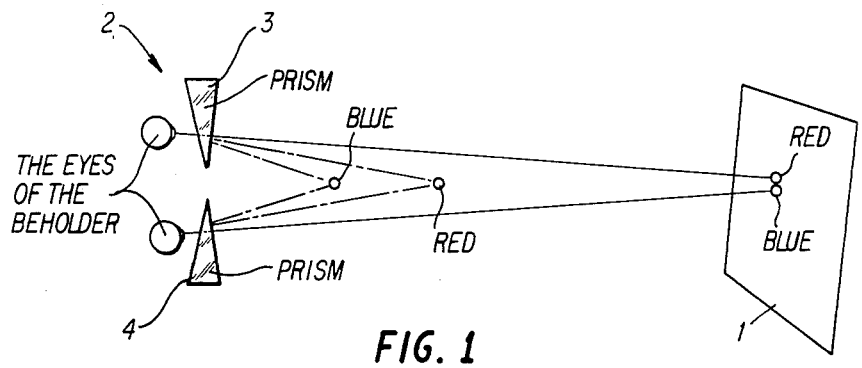
FIG. 1 is a schematic illustrating the operating principles of Applicant's process and apparatus.

Referring now to the drawings, wherein like reference numerals designate identical or corresponding parts throughout the several views and more particularly to FIG. 1 thereof, there is shown an image having two colors designated red and blue side by side on a viewing area 1 as well as a viewer indicated at 2 consisting of two prisms 3 and 4 which are separated from each other according to the shown spacing determined by the distance between the eyes of the viewer. The screen 1 contains an image which has been prepared in accordance with the color coding of the image according to the distance, or depth, which is desired to be viewed. The color coding of the image is accomplished by coloring parts of the image which are to appear distant as red with the parts of the image to appear in the middle ground as either being green or yellow and the parts of the image of the foreground being blue. Other pure colors can be used to arrive at any intermediate position desired. The scene is then viewed through the prism glasses 2 which are constructed so that the apex of the prism before each eye points towards the nose of the center of the glasses. The edges defined by the apexes of the prisms are parallel and vertical. When the scene is viewed through the glasses 2, blue objects will appear near, green objects intermediate, and red objects distant.

The blue light which passes through the prism is bent through a sharper angle than the red light. The eyes must then turn more inward to see blue object than to see a red object, even though they are actually in the same plane as illustrated on the screen 1. The brain interprets, by parallax, the blue image as being closer, and the red image as being more distant, if the parallax is not greatly overidden by or contradicted by cues such as relative size, composition, and perspective. In general, only pure colors are to be used in the color coding because any colors which are a mixture of two or more colors would be viewed as separate images by the glasses. Thus if the video tube which was displaying the image was attempting to project the depth of yellow it would require the addition of a yellow phosphor to the video tube. It is sometimes possible, however, to use impure colors with good success.

The brain system of the eye perceives depth on the basis of a variety of cues. Accordingly, there do not exist separate and definite planes of depth within the image separated according to color, but rather they are seen to be merely relative depth relationships. A small object colored red will seem to come closer as it enlarges. It will not simply appear to be getting larger. If it passes from red to green and continues to enlarge, then the blue and yet larger, the effect is of an object approaching from a great distance. Perspective, position and relative size are all important factors in the brain systems' perception of depth. In the absence of strong clues from the point of view of perspective, position and relative size, parallax will tend to dominate. If that parallax, by the use of the glasses, gives information which is strongly condicted by perspective, position, and size clues, the depth will be perceived in the image in concert with the non-parallax clues. Thus, a magazine photo showing black horses on a green field with a blue lake in the background and bluish mountains in the distance would not be expected to appear to have depth when viewed with the prism glasses, however, the effect is such that these objects do appear to have depth. This is apparently explained by the brain's interpretation of parallax differences to mean that stereoscopic depth should be perceived but the brain ignoring the actual depths which parallax would indicate in favor of the other depth cues. Thus the lake and mountains in a picture do not seem to suddenly jump to the foreground simply because they are blue.

One of the primary advantages of the stereoscopic process exemplified by Applicant's invention as shown in FIG. 1 is that there is no modification of existing hardware necessary to produce the image on the screen 1. The only modification or alteration needed is to the existing software which is easily implemented in video games or any computer-aided design systems and which merely involve color coding each portion according to a desired depth of perception of that portion. Aside from being useful in video games and computer-aided design systems the above process is also applicable to computer designed movies (TRON). The process does not require the generation of more than one view of each scene and the glasses or viewers can be easily fabricated from plastic and are inherently reliable with no moving parts or batteries to run down. Other applications include the use in air traffic control displays, binocular microscopy, viewing or printed pictures, and laser light shows.

The implementation of Applicant's process with specific software only requires the application of color according to the desired depth which is easily and markedly attainable by any one of skill in the art of computer programming.

A particular embodiment with regard to the prisms of the viewers used was a single prism of 12 diopter strength. However, it is indicated that prisms with lower power numbered diopters could be used for individuals who have difficulty with stronger prisms. The glasses can be constructed with soft plastic press-on type Fresnel prisms or they can also be constructed with a liquid filled variable angle prism. Another possible alternative would be the use of a single prism over one eye.

As an alternative to the "press-on" soft plastic prisms it has been found that a ground plastic prism type of spectacle aids in the elimination of smearing or separation of impure colors. An impure color refers to a color which derives from a mixture of phosphors while a pure color derives solely from a single phosphor in a color video monitor. While mixtures of various intensities of light from two or more phosphors create the impression of other colors, as, for example, yellow is generated by the combination of red and green, it has been indicated that the ground plastic prism spectacles eliminate much of the smearing occuring in these impure colors. Thus a major portion of any smearing seen with 12 diopter Fresnel spectacles of the press-on type was apparently due to multiple reflections between the surfaces of the Fresnel prisms and the surfaces of the laboratory goggles which were the framework of the prism.

The ground plastic prisms, on the other hand, seem to place each color at its appropriate depth as if it were a pure color with red appearing farthest away, then orange, yellow, yellow-green, green, blue-green and blue appearing in order. This is possible with these particular glasses because of the small depth separation.

The sensation of depth perceived increases as the optical strength of the prism increases. Likewise eye fatique also increases with the strength of the single prism. A balance between eye comfort and visual effect seems to be struck at approximately 6 diopters. The cause of the eye strain with high diopter type prisms comes about when the eyes are shifted to gaze from a distant object to one nearby so that the most apparent action is the turning inward of the eyes. When the eyes move, the lens in each eye refocuses. Although this happens automatically and rapidly for a given parallax position or inward turning of the eyes, the visual system expects a certain focal length to be required by the eyes' lens. Using the prism spectacles causes the eyes to have to turn inward to see the image, yet the focal length required by the eye lens is not changed. Thus, the eyes are forced to give the lens a different focal length than would normally be expected by the parallax present. Physical discomfort may then result because the lens muscles are strained to keep the lens at an unaccustomed shape. This type of eye strain is known as "accomodation" strain.

Figure 2A:
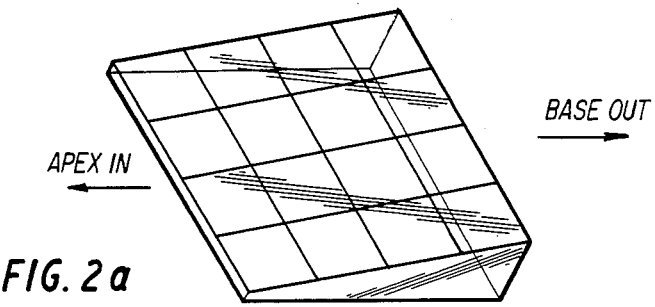
FIG. 2a shows a single uncorrected prism.
Figure 2B:
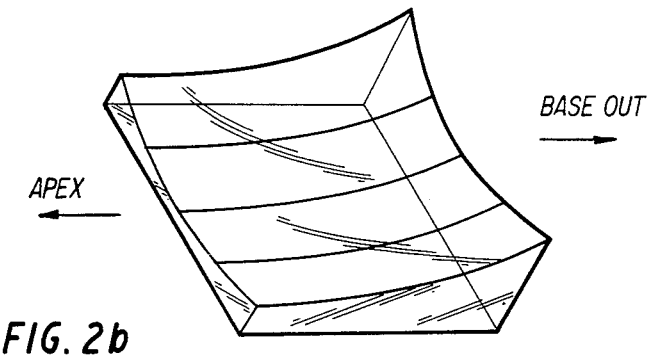
FIG. 2b shows a prism like the one shown in FIG. 2a which has been corrected by the addition of a negative diopter curvature.

The eye strain problem can be improved by the construction of a prism as shown in FIG. 2. Because the source of the eye strain is the non-coincidence of the object focus position and the image parallax position, the prisms of FIG. 1 may be modified to bring the object focus position to coincide with the image parallax position. Since the prism spectacles move the parallax position of the image closer to the viewer than the actual object position, the natural reaction of the lens is to become more sharply curved in order to focus on the expected-to-be-nearer image. To allow the lens to be able to focus on the actual object position without changing the shape of the eye lens, the viewer needs to reduce the total curvature of the eye/spectacle system. This is accomplished through the addition of a negative diopter curvature to the prism as shown in FIG. 2b. This can also be explained in conjunction with optometric correction required for nearsightedness. A nearsighted eye cannot focus on a distant object. The correction used is a negative diopter lens which, in effect, brings the plane of focus of the distant object into the region where the eye can focus. This same concept has been used to design the prism spectacles shown in FIG. 2b. Because the eye expects to focus on a near object the use of a negative diopter curvature correction to the prism brings the plane of focus nearer the viewer, ideally causing the image to appear in focus without any eye lens accomodation. That is, the spectacle lens, under ideal conditions, brings the plane of focus to coincide in space with the point at which the eyes are pointed. Because this is no different from seeing under normal circumstances, previous problems with eye strain in the single prism system are alleviated.

The negative diopter correction can be incorporated directly into the spectacle prism as shown in FIG. 2b which is a contrast to the plane system of FIG. 2a. The degree of negative diopter correction required for any chosen diopter prism can be determined empirically on a trial and error basis or by an analytical procedure. Once a good combination is found it can be easily reproduced by injection molding plastics. By providing a negative diopter correction to the prism spectacles, the eye strain and excessive accomodation experienced while using uncorrected high diopter prism spectacles as in FIG. 2a can be alleviated or eliminated. The higher dioptic prisms provide a greater perception of depth, but are quite difficult to use if they are uncorrected. The correction shown in FIG. 2 enables the alleviation of eye strain and opens the way for prism spectacles of 8, 10 or even 12 diopters to be comfortably used by anyone. It is noted that the prism shown in the FIGS. 2a and b are drawn as having a planar front face while in actual use, a spectacle prism would be added to the spherical plano surface of a standard spectacle lens.

Because the image is brought closer to the eyes when using single prism glasses, the angular dispersion between the blue light and red light does not amount to a large perceived difference in depth. Stereroscopic prism glasses tested show that the separation and depth with single prisms does not amount to more than onefourth to one-half inch. The problem is compounded if stronger prisms are used to get a greater angular separation and depth because the stronger prisms bring the image even closer. Bringing the image closer reduces the difference in depth which is perceived for a given angular difference and red light and blue light. Although a stronger prism yields a greater angular separation of the colors, the depth effect which would result is partially counteracted by the image being brought nearer to the eyes.

An alternate embodiment concerning the use of a double prism to replace the single prism stereoscopic glasses of FIGS. 1 and 2 is shown in FIG. 3. The embodiment of FIG. 3 uses a double prism stereoscopic effect to eliminate problems caused with single prism glasses which bend all of the light coming from the object thereby causing the image of the object to appear much closer to the viewer than the actual object distance. The image distance is the point at which the eyes are pointed in space. The actual object distance is the distance at which the eyes must focus. The image distance is the distance the eyes want to focus. Focusing at the actual object distance causes eye strain becasue the eyes are being focused at a distance which is different from the focal point the brain expects them to have based on the parallax of the eyes.

Another problem alleviated by a double prism system is the problem with regard to the image distance being smaller than the object distance and is called the visual disorientation or vertigo. If someone wearing single prism glasses moves his or her hand while looking at a picture, the image of the picture moves differently from the expectation of the viewer's brain. This is so because the brain believes the object to be nearer than it actually is.

The double prism shown in FIG. 3 effectively pushes the image distance back to coincide with the actual object distance and thereby making the point in space which the eyes focus on coincide with the point they expect on focus on. The pushing of the image back to the object distance allows the image to move as the brain expects it to. Likewise a given angular separation between red light and blue light will be interpreted as a greater difference in depth the further away the object.

Figure 3A:
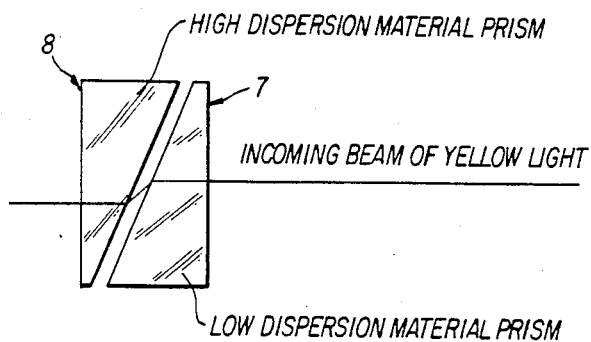
FIG. 3a is a double prism arrangement for viewers according to another embodiment of Applicant's invention.

The use of two prisms as shown in FIG. 3a provide that each of the pair of prisms 7 and 8 are placed in front of each eye. The prisms are placed with their bases in opposition with one prism being made of low dispersion material while the other prism is made of high dispersion material. The prisms are designed so that yellow light entering the first prism passes through both prisms and emerges parallel to the entering beam. The bending of the light path through the prism is somewhat exaggerated in the FIG. 3a, however, while the yellow light passes undeviated in angle through the prisms, other colors do not. Red light, for example, passes through the first prism with only a slight deviation from the yellow light because this first prism 7 is made of low dispersion material. However, the second prism causes a significant deviation in the angle of the emerging red beam from the emerging yellow beam. The effect is similar from a blue beam of light except that the blue beam will be diverged from the yellow in the opposite direction.

Figure 3D:
FIGS. 3d and 3e show constructional views of a liquid filled hollow acrylic double prism.
Figure 3B:
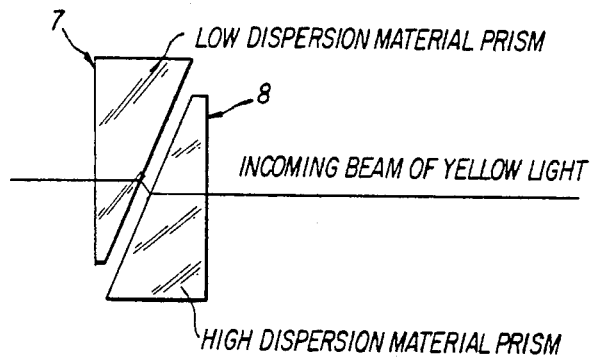
Figure 3E:
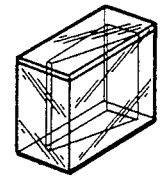

The FIG. 3b illustrates how an opposite coloring arrangement can be achieved. FIGS. 3a and 3b depict a top view of the prism pair in front of the left eye. The optics of the double prisms arrangement of the prisms 7 and 8 of FIG. 3a are reversed so that the low dispersion prism is placed before the high dispersion prism, with the prism base orientations reversed. This arrangement provides that distant objects are colored blue, with objects in the middle ground being colored yellow or green, while objects in the foreground are colored red.

Figure 3C:
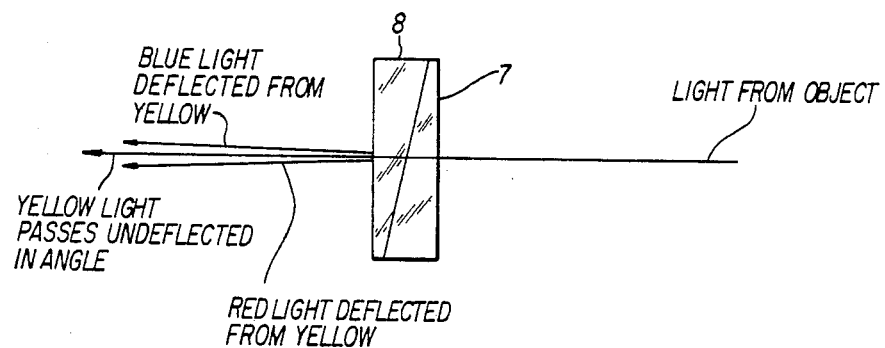

An alternate arrangement is shown in FIG. 3c where the prism faces are joined so that there is no air gap between the two prisms. The prism angles of the embodiment of FIG. 3b will be slightly different than FIG. 3a but the same effect can be achieved with fewer reflection losses.

A variety of available optical materials can be used for the two prisms. The dispersion of a material is roughly characterized by the ABBE V number for that material, defined as $n_d - 1/(n_f - n_c) = V$ where $n_d$ is the index of refraction for a standard wavelength produced by the d line of sodium of $n_f$, $n_c$ being at two other standard wavelengths. A high V number represents a low dispersion and vice versa. Various optical materials exist which have a V number of approximately 60 which is considered to be a high V number. It is desireable to use a material with a very low V number for the second prism, and ideally the material's $N_d$ should be fairly close to the first, low dispersion prism. This allows the angle of the second prism to be similar to that of the first prism, giving a greater separation of color than if the prism angle of the second prism were smaller. However, the $N_d$ of high dispersion materials tend to be high and the $N_d$ of low dispersion materials tend to be low. The two prisms in the arrangement of FIG. 3c have been calculated for a variety of materials. The optical properties of the materials are shown in Table 1 while Table 2 gives the prism angles for various combinations, along with an estimate of the maximum blue to foreground mode separation of depth of field that could be seen at a given object distance.

TABLE 1

| OPTICAL PROPERTIES OF SOME MATERIALS | | | | |
|---|---|---|---|---|
| Material | $n_c$ | $n_d$ | $n_f$ | ABBE v number |
| Low Dispersion Materials | | | | |
| Acrylic | 1.4892 | 1.491 | 1.4978 | 57.1 |
| Glycerine | 1.4706 | 1.4730 | 1.4784 | 60.6 |
| Almond Oil | 1.4755 | 1.4782 | 1.4847 | 52.0 |
| Water | 1.3312 | 1.3330 | 1.3372 | 55.5 |
| Crown Glass | 1.5204 | 1.5230 | 1.5293 | 58.8 |
| High Dispersion Materials | | | | |
| Cassia Oil | 1.5930 | 1.6026 | 1.6314 | 15.7 |
| Ethyl Cinnimate | 1.5522 | 1.5598 | 1.5804 | 19.8 |
| Anise Oil | 1.5410 | 1.5475 | 1.5647 | 23.1 |
| Quinoline | 1.608 | 1.622 | 1.6498 | 14.9 |
| Extra-Dense Flint Glass | 1.7131 | 1.7200 | 1.7377 | 29.3 |
| Styrene | 1.5849 | 1.590 | 1.604 | 30.9 |

$n_c$ = Refractive index at the C-line, 6,563 Angstrom wavelength.
$n_d$ = Refractive index at the D-line, 5,896 Angstrom wavelength.
$n_f$ = Refractive index at the F-line, 4,861 Angstrom wavelength.

TABLE 2
DOUBLE PRISM PAIRS

| Prism Material 1 | Angle 1 | Prism Material 2 | Angle 2 | Blue-to-the-Foreground Mode Separation of Depth at 4 Ft Viewing Distance |
|---|---|---|---|---|
| Acrylic | 15.8° | Styrene | 14.75° | 4.04″ |
| Acrylic | 15° | Cassia Oil | 12.17° | 10.4″ |
| Acrylic | 20° | Cassia Oil | 16.17° | 13.4″ |
| Acrylic | 15° | Quinoline | 11.79° | 11.4″ |
| Acrylic | 20° | Quinoline | 15.65° | 15.3″ |
| Glycerine | 15° | Cassia Oil | 11.72° | 9.9″ |
| Glycerine | 20° | Cassia Oil | 15.56° | 12.9″ |
| Almond Oil | 15° | Cassia Oil | 11.85° | 9.3″ |
| Almond Oil | 20° | Cassia Oil | 15.74° | 12.2″ |
| Almond Oil | 20° | Anise Oil | 17.4° | 7″ |
| Almond Oil | 30° | Anise Oil | 25.9° | 10.7″ |
| Water | 10° | Anise Oil | 6.07° | 2.54″ |
| Water | 15° | Anise Oil | 9.05° | 3,6″ |
| Glycerine | 15° | Quinoline | 11.35° | 11.1″ |
| Glycerine | 20° | Quinoline | 15.06° | 14.7″ |
| Crown Glass | 15° | Extra Dense Flint Glass | 10.83° | 4.2″ |
| Crown Glass | 20° | Extra Dense Flint Glass | 14.37° | 5.6″ |
| Acrylic | 20° | Ethyl Cinnimate | 13.12° | 7.5″ |
| Acrylic | 20° | Ethyl Cinnimate | 17.46° | 9.9″ |

Calculations indicate that the yellow image distance and the object distance will nearly perfectly coincide over a wide range of viewing distances. For the glycerin-cassia oil pair the yellow image and the actual object distances are within 1% of each other over the range from 2 inches to 15 feet. This means that there is no eye strain and no visual disorientation or distortion of the visual field for virtually all reasonable viewing distances.

Table 1 shows that glasses, plastics and liquids exist which satisfy the need for a low dispersion material and a high dispersion material. Table 2 shows that these materials can be mixed and matched in almost any combination. A preferred embodiment may be acrylic with cinnamon oil or some other liquid. This combination would lend itself to a very simple manufacturing technique. The acrylic prism can be molded as shown in FIG. 3d with a hollow prism-shaped well for the high dispersion liquid. The liquid is then placed in the well with the well sealed off and the prism then mounted in its frame. The prism unit and frame can also be manufactured as a single unit with the only restriction being that the liquid must be of such a nature that it does not attack the acrylic. Other possible arrangements would be any other suitable plastic or glass. An acrylic-styrene combination may be most suited to a Fresnel prism pair.

Also shown in Table 2 is an indication that a greater depth effect can be seen by increasing the angles of the prisms. Very large prism angles, over 20°, for example, might be best accomodated by using Fresnel prisms. Liquids can be made into Fresnel prisms by forming acrylic into Fresnel shapes. This has the additional advantage of lower weight, less thickness and less liquid required.

Figure 4A:
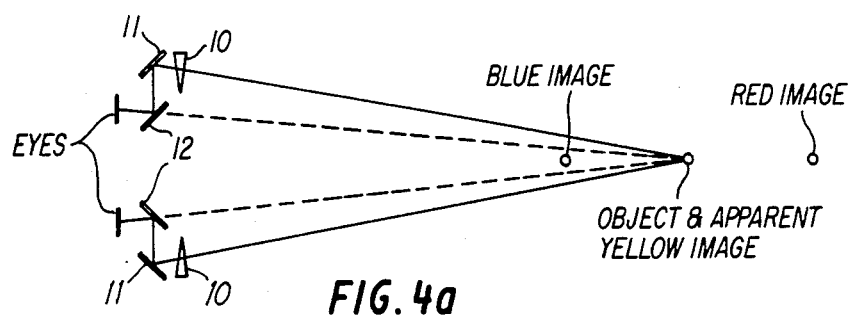
FIG. 4 is a view of a construction of a mirror and prism according to another embodiment of the viewer.
FIGS. 4b and 4c show alternate mirror and prism arrangements.
Figure 4B:
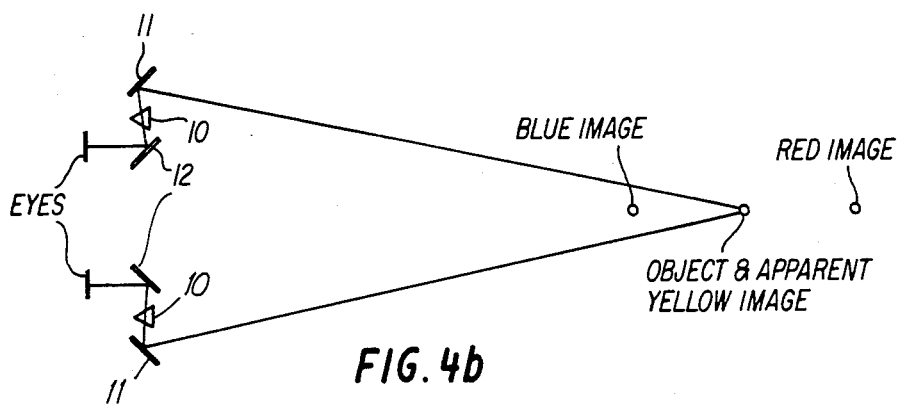
Figure 4C:
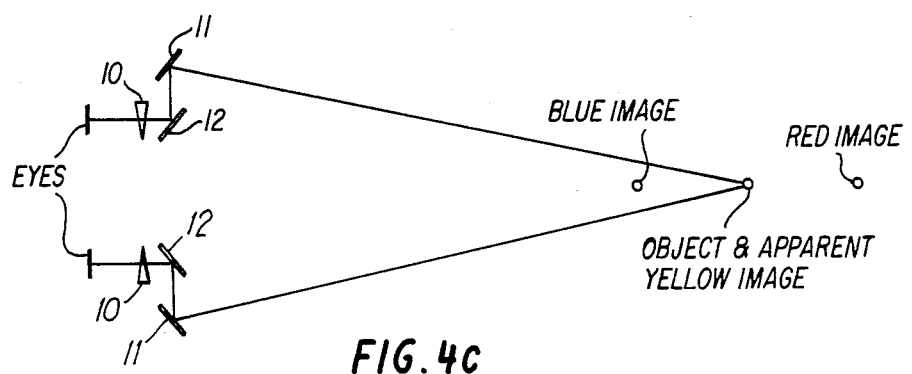

It is also indicated that the Fresnel prism arrangements need not be restricted to acrylic with other plastic or glasses being suitable. Although the double prism arrangements which move the yellow image distance back to the object distance alleviate problems of eyestrain and ther related problems with regard to limited depth effect in the process according to this invention, it is also noted that there are alternate means to achieve the effect of the double prism design. One of the alternate arrangements is shown as a combination of mirrors and a single prism as shown in the arrangements of FIGS. 4a, b, and c. The basic principle of operation concerned with FIG. 4 is that a prism is used to separate the colors in the image to each eye while the mirrors are used to bring the yellow image plane into conicidence with the object plane. The mirror and prisms may be placed in a variety of orientations. The FIG. 4a illustrates an arrangement whereby the prism 10 is placed in front of the combination of mirrors 11 and 12. The alternative arrangement of FIG. 4b indicates the prism 10 being placed between the mirrors 11 and 12 and the arrangement of FIG. 4c indicates the prism being placed after the arrangement of the mirrors 11 and 12.

Figure 5:
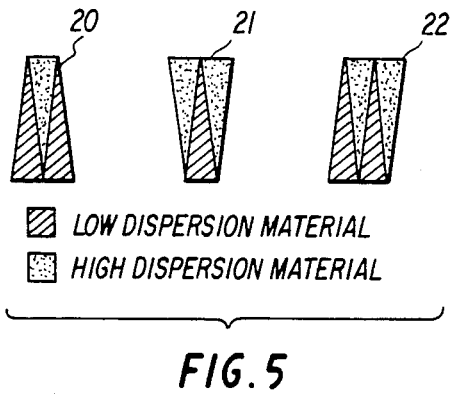

Although indicated as a double prism in the preferred embodiment it is quite possible to simulate these double prisms through the use of more than two prism elements to achieve the same effect as a double prism. The various alternative arrangements of FIG. 5 shown as 20, 21 and 22 with respectively three and four prisms serve as examples of equivalence to the two prism design. When higher number of prisms are used the total prism angles of high prism dispersion material in a multiple prism design should be roughly equal to the total prism angle for that material in a two prism design and likewise for the low dispersion material.

Figure 6:
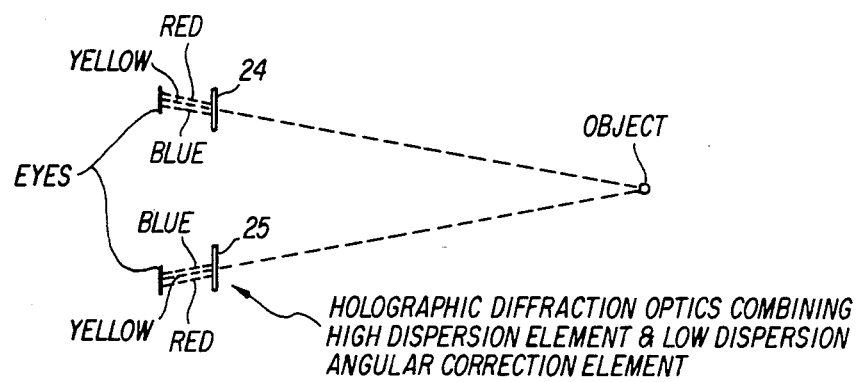

The embodiment of FIG. 6 shows a construction for replacing a double prism arrangement of optics for the glasses with a high efficiency diffraction grating for each eye shown as 24 and 25 in FIG. 6. The grating is preferably holographically generated, and serves the dual purpose of a high dispersion element and a lower dispersion angular correction element.

Figure 7:
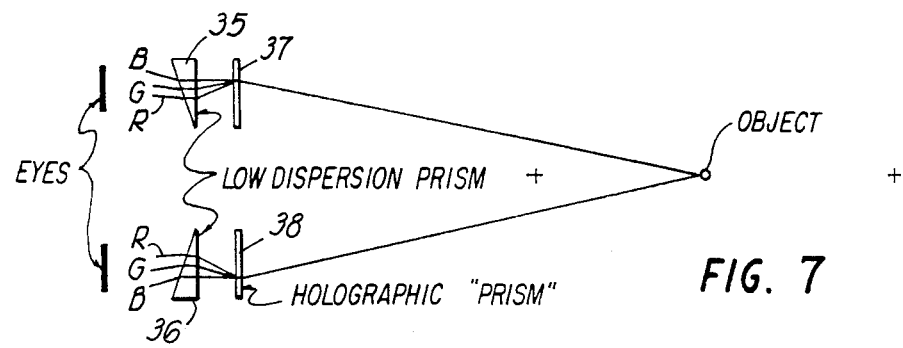
FIG. 7 shows an arrangement of a hybrid optical system.

Another embodiment of the present invention is shown in the FIG. 7 which represents a hybrid optical system made of an angle correcting prism element 35, 36 and a chromatic dispersing holographic element 37, 38. This arrangement of the low dispersion prisms 35 and 36 and the holographic prisms 37, 38 functions in a manner similar to the embodiments of FIGS. 4a, b and c to provide for the production and viewing of the stereoscopic image so that they may be viewed and perceived as having depth.

Figure 8A:
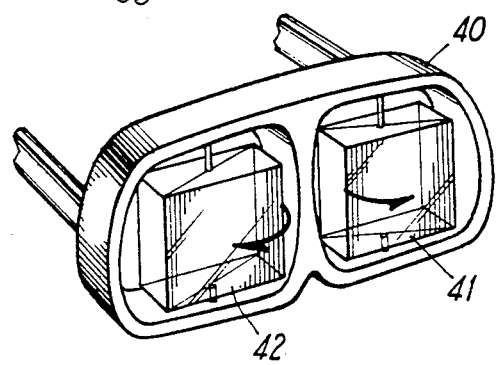
FIG. 8 shows a "reversible depth" embodiment for the double prism arrangement of FIGS. 3a and 3b.
Figure 8B:
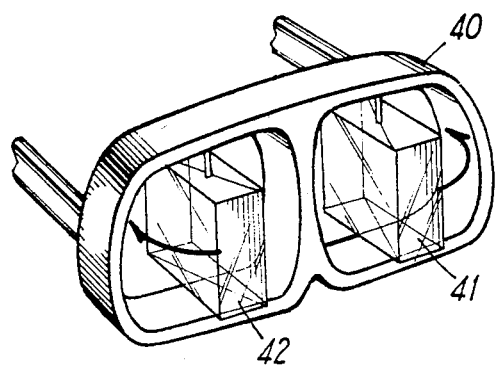
Figure 8C:
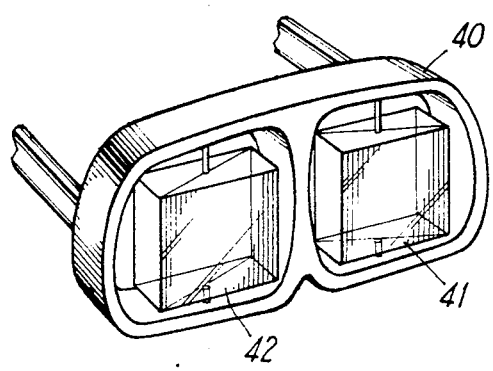

The FIG. 8 details an arrangement of a reversible depth arrangement for the double prisms shown in the FIGS. 3a and 3b. In this arrangement, a pair of glasses having frame 40 contains the set of double prisms 41 and 42 which can be rotated about their vertical axis in order to obtain images where blue is in the foreground as in FIG. 8a or where red is in the foreground as in FIG. 8c with the switching about the vertical axis being shown in the FIG. 8b. The use of this structure provides for the switching between what is effectively shown as the double prism arrangement of FIG. 3a and the alternate arrangement of the double prisms of FIG. 3b. A similar effect could be achieved by rotating the prisms 180° in the plane of the glasses face.

The arrangement of the reversible depth stereoscopic prism glasses provides an advance on the double prism stereoscopic glasses which allows the user of the glasses to choose either the blue-to-the-foreground depth mode or the red-to-the-foreground depth mode simply by reversing the prisms.

Figure 9A:
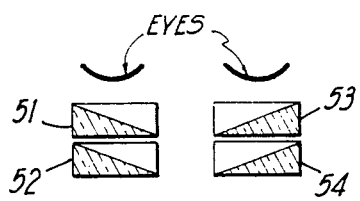
FIGS. 9a through 9h show a "tuneable depth" embodiment for the double prism arrangement of FIGS. 3a and 3b.
Figure 9B:
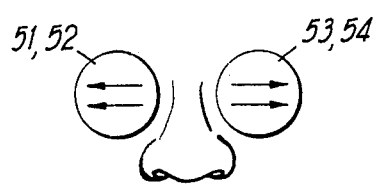
Figure 9F:
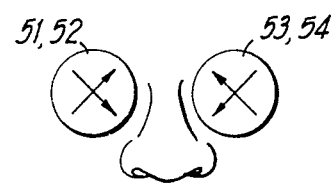
Figure 9C:
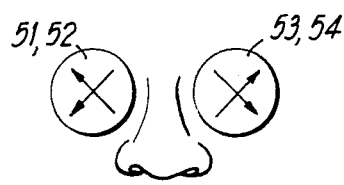
Figure 9G:
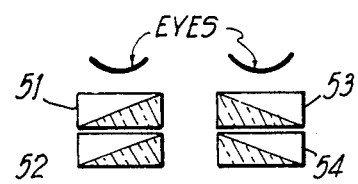
Figure 9D:
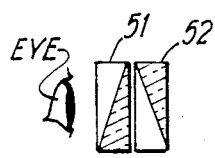
Figure 9H:
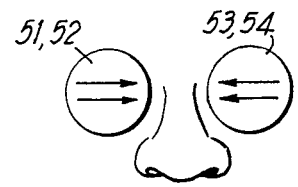
Figure 9E:
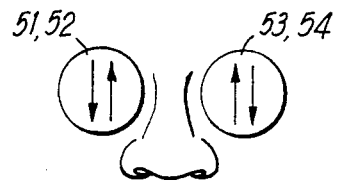
Figure 10A:
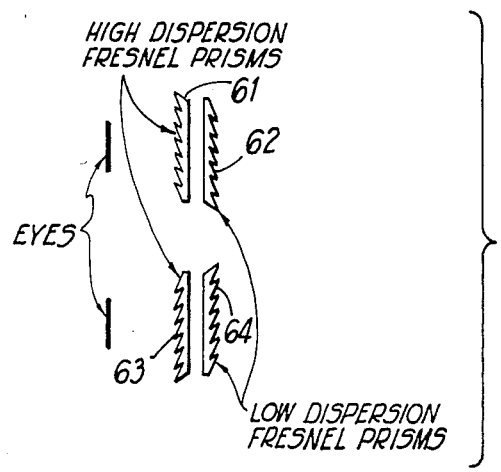
FIGS. 10a, b, c, and d detail alternate arrangements of the double prisms of FIGS. 3a and 3b when Fresnel prisms are used.
Figure 10B:
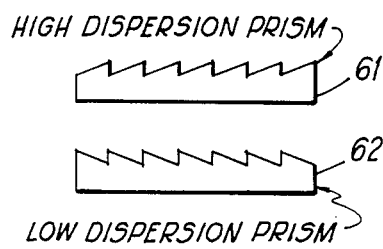
Figure 10C:
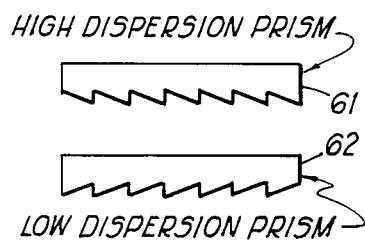
Figure 10D:
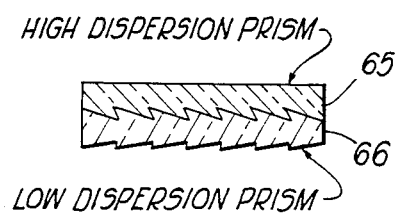

FIGS. 9a-9h illustrate the "tuneable depth" feature possible with the double prism arrangement. This arrangement allows the user of the glasses to choose the degree of depth he or she desires simply by "tuning it in". The depth chosen can vary from zero depth as shown in FIGS. 9d and e to some chosen maximum depth designed into the optics. The depth is continuously tuneable over the whole range with each 45° stop being illustrated in the FIGS. 9a-9h. The FIG. 9a shows a top view of a set 51, 52 of double prisms in front of the right eye and a set 53, 54 in front of the left eye for a setting whereby the prisms are set to the mode where blue is in the foreground and the chromatic dispersion of each double prism in the set adds to the total dispersion. The FIG. 9b shows a front view of the arrangement of FIG. 9a. The FIG. 9c illustrates the front view of the glasses whereby the prisms are rotated with respect to each other by 45° from the position of the FIGS. 9a and b and whereby the depth is such that intermediate blue to the foreground would be shown. The FIGS. 9d and e illustrate the side and front view of the arrangement whereby zero depth would be shown as previously discussed. The FIG. 9f illustrates a further rotation of 45° so that the depth would be such that the intermediate red is to the foreground and the FIGS. g and h indicate a further 45° rotation to provide a depth such that a maximum red is to the foreground. The FIGS. 9g and h correspond to a 180° rotation from that of the FIGS. 9a and b. In the case of the zero depth setting of FIGS. 9d and e the dispersion of each double prism in a set cancels each other. The arrows in the Figures indicate the prism vectors. As is illustrated in the FIG. 9, the setting of each prism vector with respect to the horizontal is equal and opposite that of the other prism vector for that particular prism set in order to ensure that the vertical component of the dispersion of the double prism set is always zero.

Because the contribution of the vertical dispersion is equal and opposite for both prisms it is necessary to mechanically link the four sets of double prisms so that they will all move in a complementary fashion in order to keep the same angle between the prism vectors and the horizontal. This may be accomplished through the use of any of a variety of mechanical linkages which could be employed to accomplish this rotation. Thus the depth chosen can vary from zero to some chosen maximum depth designed into the optics. The depth is smoothly tuneable over the entire range with the user being able to choose the foreground color at will, either blue or red.

The FIG. 10 illustrates the various arrangements of sets of double prisms 61, 62, 63, 64 which are possible when a Fresnel design type of prism is used. The FIG. 10a illustrates the Fresnel prisms being placed such that their smooth sides are back to back and the FIG. 10b illustrates an arrangement whereby the high dispersion prism and the low dispersion prism are arranged such that the rought side is on top for each of the two prisms. On the other hand the FIG. 10c illustrates the smooth side of each of the prisms being in the top side while the FIG. 10d illustrates another arrangement whereby the two prisms 65, 66 are constructed so that the rough or jagged sides are interleaved with a smooth surface being on the top of the interconnected structure and a jagged side being on the bottom.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for producing and viewing stereoscopic images, comprising the steps of:
    color coding each portion of an image to be viewed according to the desired depth appearance of said portion with respect to the remaining portions of said image; and
    viewing said image through a viewer means which passes light of a chosen color without imparting an angular deviation to said light from its original path, and which deviates light of other colors to either side of the chosen color with respect to the chosen color, and said color coded portion of said image appearing at said desired appearance depth wherein said viewer means includes at least one optical element for each of the left and right eye wherein the at least one optical element is a diffractive optical element.

2. The method of claim 1 whereby said color coding step further includes color coding as red the portion of said image which is to appear most distant from said viewer means and color coding as blue the portion of said image which is to appear nearest to said viewer means.

3. The method of claim 2 wherein said color coding step further includes coloring the portions of said image which are to appear between said most distant portion and said nearest portion as one of orange, yellow, yellow-green, and blue-green in accordance with the respective distance from said portion to appear most distant from said viewer means.

4. The method of claim 1 wherein said color coding step is accomplished through the use of pure colors.

5. The method according to claim 1 wherein the step of color coding each portion is modified by the natural appearance, size and natural color of said each portion.

6. The method according to claim 1 wherein said step of viewing said image through said viewer means is accomplished through the use of a computer generated color image.

7. The method of claim 1 whereby said color coding step further includes color coding as blue, the portion of said image which is to appear most distant from said viewer means and color coding as red, the of said image which is to appear nearest to said viewer means.

8. The method of claim 1 wherein said viewer means further includes at least one refractive optical element for each of the left and right eye.

9. The method of claim 1 wherein the at least one diffractive optical element is holographically generated.

10. The method of claim 8 wherein the at least one diffractive optical element is holographically generated.

11. The method of claim 1 wherein said viewing step further comprises the steps of:
    chromatically dispersing all colors of light through various angles dependent upon the spectral position of each color; and
    centering said chosen color of light relative to said light of other colors by angularly deflecting said other colors of light through an angle substantially equal and opposite to the angle of said chromatic dispersion of said chosen color of light.

12. The method of claim 11 wherein said dispersing and centering steps are performed simultaneously.

13. The method of claim 11 wherein said dispersing and centering steps are performed sequentially.

14. The method of claim 11 wherein said dispersing and centering steps are performed by the at least one diffractive optical element.

15. The method of claim 11 wherein one of said dispersing and centering steps is performed by the at least one diffractive optical element and the other of said steps is performed by at least one refractive optical element.

16. The method of claim 14 wherein the at least one diffractive optical element is holographically generated.

17. The method of claim 15 wherein the at least one diffractive optical element is holographically generated.

18. The method of claim 15 wherein the at least one refractive optical element is a prism.

19. A stereoscopic system for producing and viewing an image, comprising:
 a color coded image; having each portion of the image to be viewed colored according to the desired appearance depth of said portion with respect to the remaining portions of said image; and
 viewing means including at least one optical element for each of the left and right eye wherein the at least one optical element is a diffractive optical element for viewing said image through the viewer means which passes light of a chosen color without imparting an angular deviation to said light from its original path, and which deviates light of other colors to either side of the chosen color through various angles according to the spectral relationship of each color with respect to the chosen color, and said color coded portions of said image appearing at said desired appearance depth.

20. The system of claim 19 wherein said color coded image has a red color for the portion of said image which is to appear most distant from said viewer means and a blue color for the portion of said image which is to appear nearest to said viewer means.

21. The system of claim 20 wherein said color coded image has the portions of said image which are to appear between said most distant portion and said nearest portion as one of orange, yellow, yellow-green, and blue-green color in accordance with the respective distance from said portion to appear most distant from said viewer means.

22. The system of claim 19 wherein said colors of said image are pure, nearly monochromatic colors.

23. The system according to claim 19 wherein the color coding of each portion is modified by the natural appearance, size and natural color of said each portion.

24. The system of claim 19 wherein said viewer means further comprises means for chromatically dispersing all colors of light through various angles dependent upon the spectral position of each color, and means for centering said chosen color of light relative to said light of other colors by angularly deflecting said light through an angle substantially equal and opposite to the angle of said chromatic dispersion of said chosen color of light.

25. The system of claim 24 wherein the chromatically dispersing means and the angularly deflecting means comprise the at least one diffractive element.

26. The system of claim 24 wherein one of said dispersing or centering means is performed by the at least one diffractive optical element and the other of said means is performed by at least one refractive optical element.

27. The system of claim 25 wherein the at least one diffractive optical element is holographically generated.

28. The system of claim 26 wherein the at least one diffractive optical element is holographically generated.

29. The system of claim 26 wherein the at least one refractive optical element is a prism.

30. The system according to claim 19 wherein said image means is color coded by a computer generated color image.

31. The system of claim 19 wherein said color coded display has a blue color for the portion of said image which is to appear most distant from said viewer means and a red color for the portion of said image which is to appear nearest to said viewer means.

* * * * *